(12) United States Patent
Ryu et al.

(10) Patent No.: US 11,581,554 B2
(45) Date of Patent: Feb. 14, 2023

(54) COOLING CONTROL SYSTEM AND METHOD OF FUEL CELL

(71) Applicants: Hyundai Motor Company, Seoul (KR); Kia Motors Corporation, Seoul (KR)

(72) Inventors: Jung Hwan Ryu, Gyeonggi-do (KR); Dong Hun Lee, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 262 days.

(21) Appl. No.: 16/388,341

(22) Filed: Apr. 18, 2019

(65) Prior Publication Data

US 2020/0185733 A1    Jun. 11, 2020

(30) Foreign Application Priority Data

Dec. 5, 2018 (KR) .................. 10-2018-0155322

(51) Int. Cl.
| | |
|---|---|
| *H01M 8/04007* | (2016.01) |
| *H01M 8/04029* | (2016.01) |
| *H01M 8/0432* | (2016.01) |
| *H01M 8/04746* | (2016.01) |
| *H01M 8/04701* | (2016.01) |

(52) U.S. Cl.
CPC ... *H01M 8/04074* (2013.01); *H01M 8/04029* (2013.01); *H01M 8/04358* (2013.01); *H01M 8/04365* (2013.01); *H01M 8/04723* (2013.01); *H01M 8/04768* (2013.01)

(58) Field of Classification Search
None
See application file for complete search history.

(56) References Cited

U.S. PATENT DOCUMENTS

2018/0114998 A1    4/2018  Kwon et al.
2018/0183080 A1*   6/2018  Yamada ............ H01M 8/04029

FOREIGN PATENT DOCUMENTS

KR           101628514 B1    6/2016

* cited by examiner

*Primary Examiner* — Carmen V Lyles-Irving
(74) *Attorney, Agent, or Firm* — Fox Rothschild LLP

(57) ABSTRACT

A cooling control method of a fuel cell is provided. The method includes estimating a temperature of a separator based on heat exchange between the separator formed between unit cells of a fuel cell stack and coolant flowing through a cooling line between the separators. A ratio of coolant passing through a heat exchange device to coolant bypassing the heat exchange device is adjusted based on the estimated temperature of the separator. Additionally, a rotation speed of a pump for circulating coolant for cooling the fuel cell stack is adjusted based on the estimated temperature of the separator.

8 Claims, 3 Drawing Sheets

COOLING CONTROL SYSTEM AND METHOD OF FUEL CELL

CROSS-REFERENCE TO RELATED APPLICATION

This application claims priority to Korean Patent Application No. 10-2018-0155322, filed on Dec. 5, 2018, the disclosure of which is incorporated herein by reference.

BACKGROUND

1. Field of the Invention

The present invention relates to a cooling control system and method of a fuel cell and, more particularly, to cooling control that more accurately estimates the internal temperature of a fuel cell stack and adjusts the temperature and flow rate of coolant to cool the fuel cell stack.

2. Description of the Related Art

A fuel cell converts chemical energy into electric energy using oxidation-reduction reaction between hydrogen and oxygen respectively supplied from a hydrogen supply device and an air supply device and includes a fuel cell stack that generates electric energy and a cooling system that cools the fuel cell stack. In other words, hydrogen is supplied to an anode of the fuel cell stack and oxidation reaction of hydrogen is performed in the anode, thereby generating hydrogen ions (protons) and electrons. The hydrogen ions and electrons generated at this time are moved to a cathode through an electrolyte membrane and a separator, respectively. In the cathode, water is generated through electrochemical reaction between the hydrogen ions and the electrodes moved from the anode and oxygen of air. Electric energy is then generated by the flow of electrons.

By such chemical reaction, thermal energy is generated in the fuel cell stack along with electric energy. To prevent the fuel cell stack from overheating and deteriorating due to thermal energy, the fuel cell stack includes a cooling system. In particular, a water cooling type cooling system for cooling the fuel cell stack by forming a cooling channel, through which coolant flows, between unit cells included in the fuel cell stack has been developed.

In the cooling system, since it is difficult to directly measure the temperature of the fuel cell stack, the temperature of the fuel cell stack is indirectly estimated using the temperature of the coolant discharged from the fuel cell stack. In addition, by operating a pump to cause coolant to flow or a thermostat for adjusting a ratio of coolant passing through a radiator to coolant bypassing the radiator according to the estimated temperature of the fuel cell stack, cooling of the fuel cell stack is adjusted. However, according to this control method, it is difficult to rapidly estimate the changed temperature of the fuel cell stack, and power consumption of the pump occurs unnecessarily, thereby decreasing fuel efficiency.

The matters disclosed in this section are merely for enhancement of understanding of the general background of the invention and should not be taken as an acknowledgment or any form of suggestion that the matters form the related art already known to a person skilled in the art.

SUMMARY

The present invention provides a method of controlling cooling of a fuel cell stack by estimating the temperature of the fuel cell stack according to the amount of heat exchanged between a separator and coolant and operating an electronic thermostat and a coolant pump.

In accordance with an aspect of the present invention, the above and other objects may be accomplished by a cooling control system of a fuel cell that may include a fuel cell stack having a separator formed between unit cells, a cooling line, through which coolant for cooling the fuel cell stack flows, a heat exchange device disposed on the cooling line to cool the coolant in the cooling line through heat exchange with the outside, a bypass line configured to branch off from the cooling line at a point before passing through the heat exchange device and to join the cooling line at a point after passing through the heat exchange device to bypass the heat exchange device, a temperature control device disposed at the point where the bypass line branches off from or joins the cooling line to adjust a ratio of coolant received from the cooling line to coolant received from the bypass line, a temperature estimator configured to estimate a temperature of the separator based on heat exchange between the separator and the coolant flowing through the cooling line between the separators, and an opening degree controller configured to operate the temperature control device based on the temperature of the separator estimated by the temperature estimator.

The temperature control device may be an electronic thermostat, and the opening degree controller may be configured to adjust an opening degree of the temperature control device to adjust a flow rate of the coolant flowing through the cooling line and the bypass line. The cooling control system may further include first and second temperature sensors respectively disposed at a position where coolant flows into the fuel cell stack of the cooling line and a position where coolant is discharged from the fuel cell stack. The temperature estimator may be configured to estimate the temperature of the separator according to heat exchange between the fuel cell stack and the coolant using the inlet and outlet temperatures of the coolant measured by the first and second temperature sensors and the amount of heat generated in the fuel cell stack.

The opening degree controller may be configured to operate the temperature control device such that an inlet temperature of the coolant flowing from the cooling line into the fuel cell stack is adjusted to a predetermined target temperature when the temperature of the separator is less than a predetermined reference temperature, and operate the temperature control device such that the inlet temperature of the coolant flowing from the cooling line into the fuel cell stack is adjusted to a variable target temperature reduced from the predetermined target temperature in proportion to a difference between the temperature of the separator and the predetermined reference temperature when the temperature of the separator is equal to or greater than the predetermined reference temperature.

The cooling control system may further include a cooling pump disposed on the cooling line to circulate the coolant through the cooling line, and a pump controller configured to adjust a rotation speed of the cooling pump water based on the temperature of the separator estimated by the temperature estimator or the ratio of the coolant adjusted by the temperature control device.

In accordance with another aspect of the present invention, the above and other objects may be accomplished by a cooling control method of a fuel cell that may include estimating a temperature of a separator based on heat exchange between the separator formed between unit cells of a fuel cell stack and coolant flowing through a cooling line between the separators, adjusting a ratio of coolant passing through a heat exchange device to coolant bypassing the heat exchange device based on the estimated temperature of the separator, and adjusting a rotation speed of a pump for circulating coolant to cool the fuel cell stack based on the estimated temperature of the separator.

The estimating of the temperature of the separator may include estimating the temperature of the separator according to heat exchange between the fuel cell stack and the coolant using temperatures of the coolant respectively measured at an inlet and an outlet of the fuel cell stack and the amount of heat generated in the fuel cell stack. The estimating of the temperature of the separator may include assuming that an initial temperature of the separator is equal to the temperature of the coolant, estimating temperature change of the separator according to heating caused by the heat generated in the fuel cell stack and cooling caused by heat exchange with the coolant flowing between the separators.

The adjusting of the ratio of the coolant may include adjusting an opening degree of a valve to adjust a flow rate of coolant passing through the heat exchange device of an electronic thermostat or an opening degree of a valve to adjust a flow rate of coolant bypassing the heat exchange device. The adjusting of the ratio of the coolant may include adjusting an inlet temperature of the coolant flowing into the fuel cell stack to a variable target temperature reduced from a predetermined target temperature in proportion to a difference between the temperature of the separator and a predetermined reference temperature when the temperature of the separator is equal to or greater than the predetermined reference temperature.

Additionally, the adjusting of the ratio of the coolant may include adjusting the inlet temperature of the coolant flowing into the fuel cell stack to the predetermined target temperature when the temperature of the separator is less than the predetermined reference temperature. The adjusting of the rotation speed of the pump may include adjusting the rotation speed of the pump to a target rotation speed obtained by adding or subtracting a variable amount proportional to a difference between the temperature of the separator and a predetermined reference temperature to or from a predetermined rotation speed.

In the adjusting of the rotation speed of the pump, the variable amount may be proportional to an opening degree of a valve for adjusting a flow rate of the coolant passing through the heat exchange device when the temperature of the separator is equal to or greater than the predetermined reference temperature. In addition, the variable amount may be proportional to a predetermined ratio when the temperature of the separator is less than the predetermined reference temperature.

Further, the adjusting of the rotation speed of the pump may include adjusting the rotation speed of the pump to a predetermined rotation speed until a valve for adjusting a flow rate of the coolant passing through the heat exchange device is completely opened. The adjusting of the rotation speed of the pump may also include adjusting the rotation speed of the pump to a target rotation speed obtained by adding a variable amount proportional to a difference between the temperature of the separator and a predetermined reference temperature to the predetermined rotation speed when the valve for adjusting the flow rate of the coolant passing through the heat exchange device is completely opened.

In accordance with another aspect of the present invention, the above and other objects may be accomplished by a cooling control method of a fuel cell including estimating a temperature of a fuel cell stack, adjusting a ratio of coolant passing through a heat exchange device to coolant bypassing the heat exchange device based on the estimated temperature of the fuel cell stack, and adjusting a rotation speed of a pump for circulating the coolant for cooling the fuel cell stack based on the estimated temperature of the fuel cell stack.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
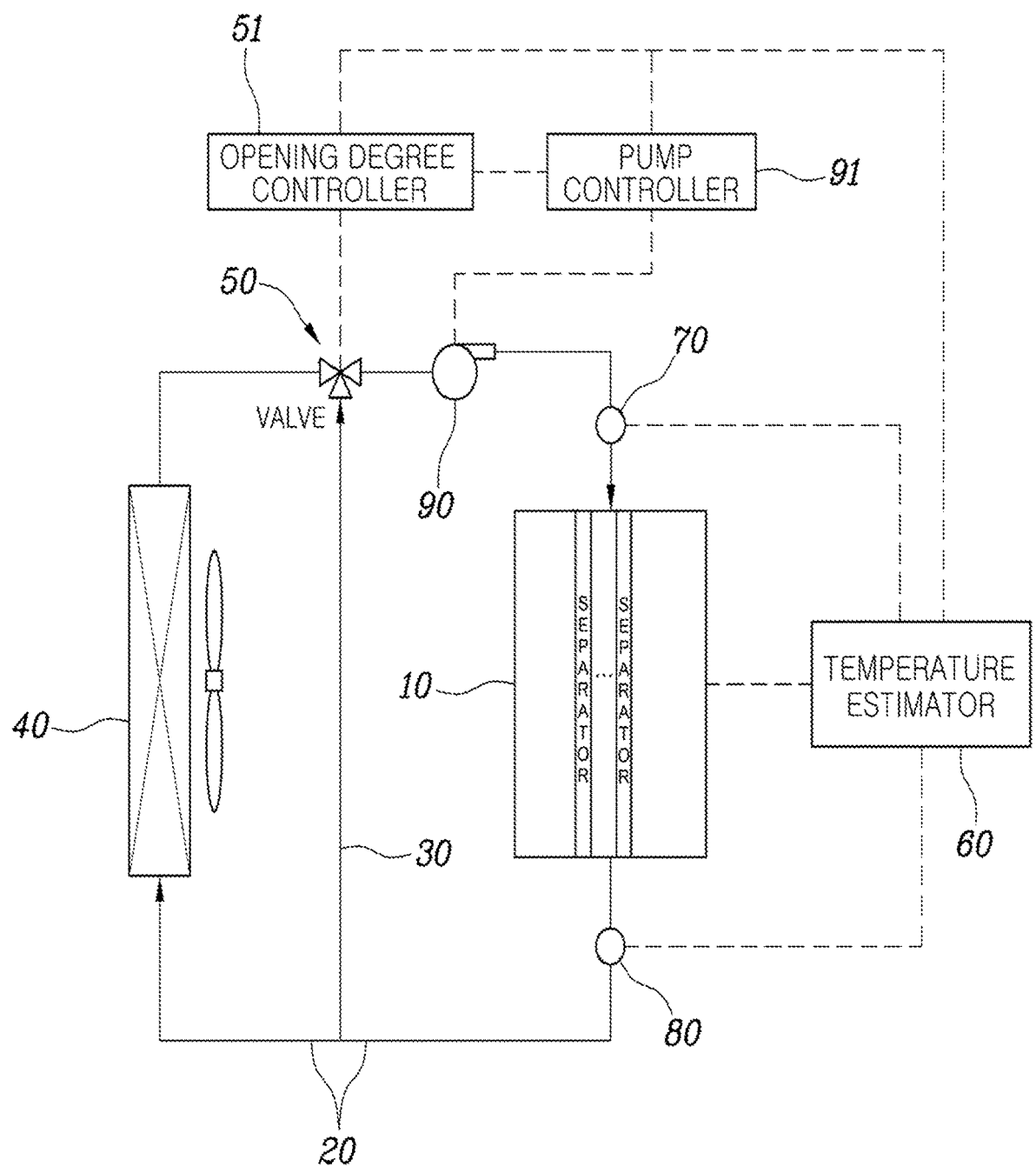
FIG. 1 is a diagram showing the configuration of a cooling control system of a fuel cell according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specific structural and functional descriptions of the exemplary embodiments of the present invention disclosed in this specification or application are only for the purpose of illustrating embodiments of the present invention, and the exemplary embodiments according to the present invention may be embodied in various forms and should not be construed as limited to the embodiments set forth in this specification or application.

Since the exemplary embodiments of the present invention may be variously changed and the exemplary embodiments of the present invention may be realized in various forms, specific exemplary embodiments of the present invention will be described herein in detail with reference to the appended drawings of the exemplary embodiments of the present invention. However, the present invention will not be limited only to the specific exemplary embodiments of the present invention which are disclosed herein. Therefore, it should be understood that the scope and spirit of the present invention can be extended to all variations, equivalents, and replacements in addition to the appended drawings of the present invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

It will be understood that, when an element is referred to as being "connected with" another element, the element can be directly connected with the other element or intervening elements may also be present. In contrast, when an element is referred to as being "directly connected with" another element, there are no intervening elements present. Other expressions for describing relationships between elements, for example, "between" and "immediately between" or "neighboring" and "directly neighboring" may also be understood likewise.

In the present disclosure, the term "include" or "have" signifies the presence of a specific feature, number, step, operation, component, or part, or combinations thereof, not excluding the presence or addition of one or more other features, numbers, steps, operations, components, or parts, or combinations thereof. All terms including technical or scientific terms have the same meanings as generally understood by a person having ordinary skill in the art to which the present invention pertains unless mentioned otherwise. Generally used terms, such as terms defined in a dictionary, should be interpreted to coincide with meanings of the related art from the context. Unless obviously defined in the present invention, such terms are not interpreted as having ideal or excessively formal meanings.

Hereinafter, the exemplary embodiments of the present invention will be described in detail with reference to the accompanying drawings. The same reference numerals designate the same constituent elements throughout the description of the drawings.

FIG. 1 is a diagram showing the configuration of a cooling control system of a fuel cell according to an exemplary embodiment of the present invention. Referring to FIG. 1, the cooling control system of the fuel cell according to the exemplary embodiment of the present invention may include a fuel cell stack 10 having a separator formed between unit cells; a cooling line 20, through which coolant for cooling the fuel cell stack 10 may flow; a heat exchange device 40 disposed on the cooling line 20 to cool the coolant in the cooling line 20 through heat exchange with the outside; a bypass line 30 branching off from the cooling line 20 at a point before passing through the heat exchange device 40 and joining the cooling line 20 at a point after passing through the heat exchange device 40 to bypass the heat exchange device 40; a temperature control device 50 disposed at the point where the bypass line 30 branches off from or joins the cooling line 20 to adjust a ratio of coolant received from the cooling line 20 to coolant received from the bypass line 30; a temperature estimator 60 (e.g., sensor) configured to estimate the temperature of the separator based on heat exchange between the coolant in the cooling line 20 and the separator; and an opening degree controller 51 configured to operate the temperature control device 50 based on the temperature of the separator estimated by the temperature estimator 60.

The fuel cell stack 10 receives hydrogen and oxygen in each unit cell included therein and generates electric energy through chemical reaction therein. According to chemical reaction between hydrogen and oxygen, thermal energy is generated in the fuel cell stack 10 and, for durability and power generation performance, the fuel cell stack 10 should be operated in an appropriate temperature range. The fuel cell stack 10 may be cooled, by disposing the separator between the unit cells included therein and allowing coolant to flow along a coolant channel between the separators. The cooling line 20 may be connected to the coolant channel to cool the fuel cell stack 10 while coolant flows.

The heat exchange device 40 is a heat radiation device configured to radiate heat of coolant within the cooling line 20 to the outside, and may include a radiator and a radiation fan. The coolant of the cooling line 20 may be cooled by heat exchange with the outside while passing through the heat exchange device 40. The bypass line 30 may branch off from the cooling line 20 at the point before passing through the heat exchange device 40 and may join the cooling line 20 at the point after passing through the heat exchange device 40, thereby bypassing the heat exchange device 40. The bypass line 30 may be formed to increase the temperature of coolant or appropriately maintain the temperature of coolant.

The temperature control device 50 may be configured to adjust the flow rate of the coolant of the bypass line 30 and the cooling line 20. In other words, the temperature control device 50 may be disposed at the point where the bypass line 30 branches off from or joins the cooling line 20 to adjust the ratio of the coolant received from the cooling line 20 to the coolant received from the bypass line 30. Therefore, the temperature of the coolant flowing into the inlet of the fuel cell stack 10 may be adjusted. The temperature estimator 60 may be configured to estimate the temperature of the separator based on heat exchange between the separator and the coolant flowing through the cooling line 20 between the separators. By estimating heat exchange between the separator and the coolant flowing between the separators, the temperature change of the separator may be estimated.

The opening degree controller 51 may be configured to operate the temperature control device 50 using the estimated temperatures of the separator, thereby adjusting the temperature of the coolant flowing into the inlet of the fuel cell stack 10. Therefore, it may be possible to more accurately estimate the internal temperature of the fuel cell stack 10 and to proactively adjust the temperature of the fuel cell stack 10 using the temperature control device 50. Specifically, the temperature control device 50 may be an electronic thermostat and the opening degree controller 51 may be configured to adjust the opening degree of the temperature control device 50 to adjust the flow rate of the coolant flowing through the cooling line 20 and the bypass line 30.

The temperature control device 50 may be a thermostat including a valve formed on the cooling line 20 to adjust the flow rate of the coolant passing through the heat exchange device 40 or a valve formed on the bypass line 30 to adjust the flow rate of the coolant bypassing the heat exchange device 40. The opening degree controller 51 may be configured to adjust the opening degree of the valve of in the thermostat to correspond to or reach the target temperature of the coolant.

A first temperature sensor 70 and a second temperature sensor 80, which are respectively disposed at a position where coolant flows into the fuel cell stack 10 of the cooling line 20 and a position where coolant is discharged from the fuel cell stack 10 may be configured to measure the temperature of the coolant. The temperature estimator 60 may be configured to estimate the temperature of the separator according to heat exchange between the coolant and the fuel cell stack 10 using the amount of heat generated in the fuel cell stack 10 and the coolant inlet and outlet temperatures respectively measured by the first temperature sensor 70 and the second temperature sensor 80. The first temperature sensor 70 may be configured to measure the coolant inlet temperature at the inlet of the fuel cell stack 10 and the second temperature sensor 80 may be configured to measure the coolant outlet temperature at the outlet of the fuel cell stack 10.

Further, a cooling pump 90 may be disposed on the cooling line 20 to circulate the coolant through the cooling line 20 and a pump controller 91 may be configured to adjust the rotation speed of the cooling pump 90 based on the temperature of the separator estimated by the temperature estimator or the coolant ratio adjusted by the temperature control device 50. The cooling pump 90 may be disposed on the cooling line 20 to circulate the coolant through the cooling line 20. The pump controller 91 may be configured to adjust the rotation speed of the cooling pump 90 to adjust the flow rate of the coolant circulated through the cooling line 20.

Additionally, the opening degree controller 51 may be configured to operate the temperature control device 50 to thus adjust the inlet temperature of the coolant flowing from the cooling line 20 into the fuel cell stack 10 to a predetermined target temperature when the temperature of the separator is less than a predetermined reference temperature. The opening degree controller 51 may also be configured to operate the temperature control device 50 to adjust the inlet temperature of the coolant flowing from the cooling line 20 into the fuel cell stack 10 to a variable target temperature reduced from the predetermined target temperature in proportion to a difference between the temperature of the separator and the predetermined reference temperature when the temperature of the separator is equal to or greater than the predetermined reference temperature.

Figure 2:
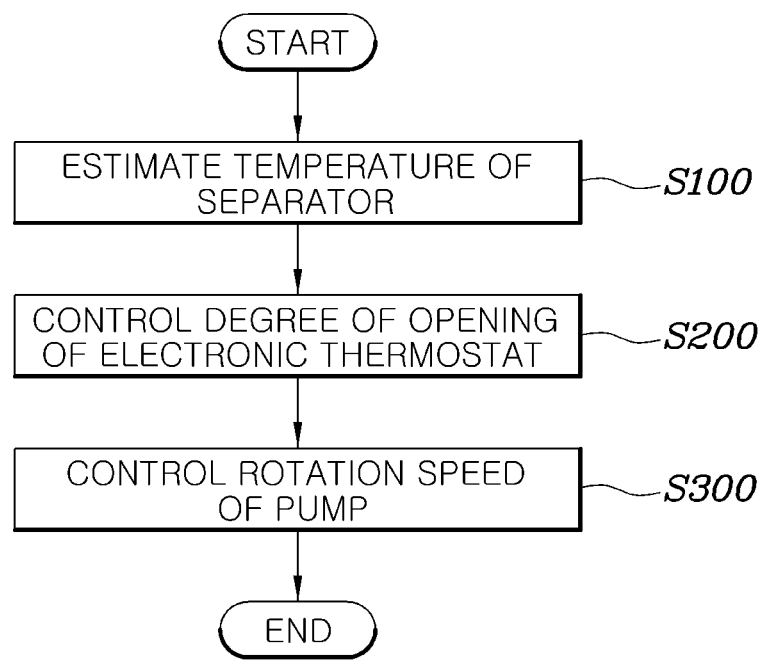
FIG. 2 is a flowchart illustrating a cooling control method of a fuel cell according to an exemplary embodiment of the present invention.

FIG. 2 is a flowchart illustrating a cooling control method of a fuel cell according to an exemplary embodiment of the present invention. The method described herein below may be executed by a controller having a processor and a memory. Referring to FIG. 2, the cooling control method of the fuel cell according to the exemplary embodiment of the present invention may include estimating the temperature of the separator based on heat exchange between the separator formed between the unit cells of the fuel cell stack and the coolant flowing through the cooling line between the separators (S100); adjusting the ratio of the coolant passing through the heat exchange device to the coolant bypassing the heat exchange device based on the estimated temperature of the separator (S200); and adjusting the rotation speed of the pump for circulating the coolant for cooling the fuel cell stack based on the estimated temperature of the separator (S300).

Figure 3:
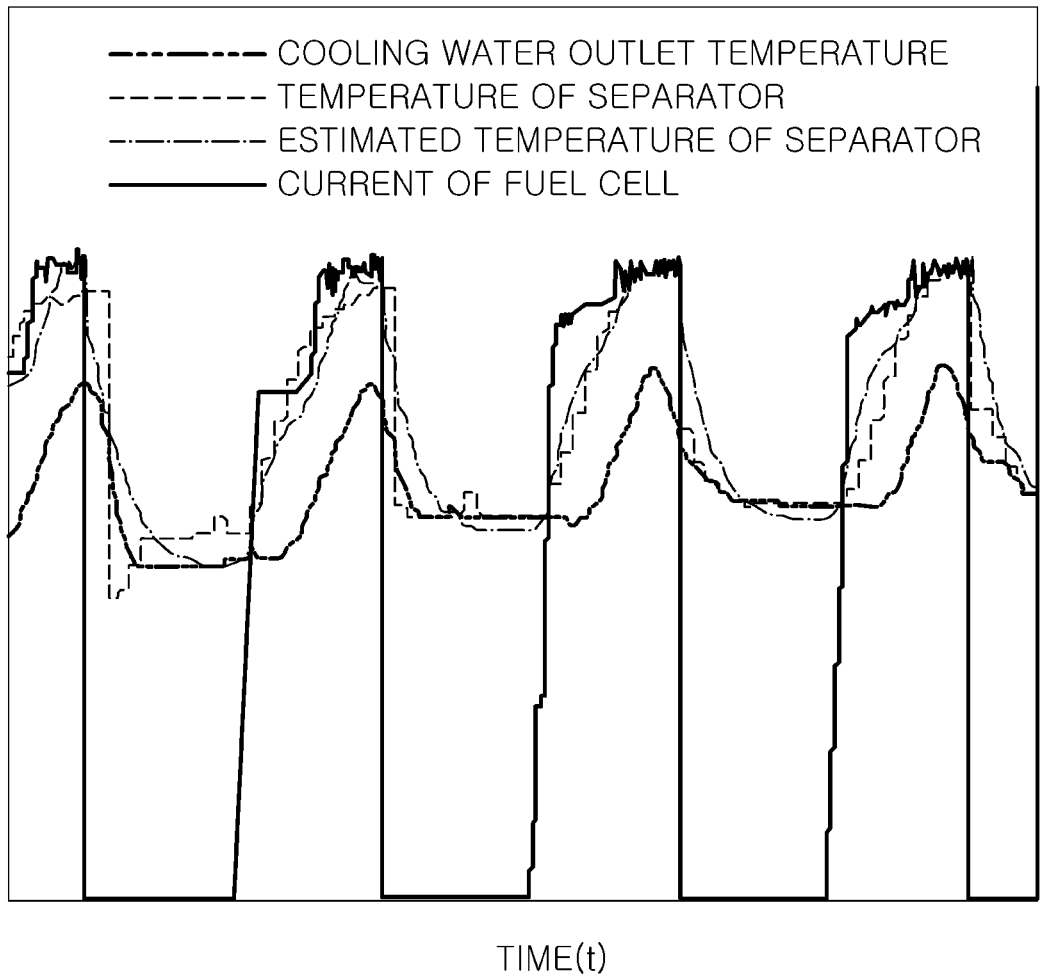
FIG. 3 is a graph showing a relationship between the current of a fuel cell stack and the temperature of a separator according to an exemplary embodiment of the present invention.

FIG. 3 is a graph showing a relationship between the current of a fuel cell stack and the temperature of a separator according to an exemplary embodiment of the present invention. Referring to FIG. 3, when current of the fuel cell increases, heat is generated in the fuel cell stack according to exothermic reaction to increase the temperature of the fuel cell stack, the temperature of a separator adjacent thereto and the coolant outlet temperature may be increased.

In general, the temperature of the coolant (e.g., the coolant outlet temperature) discharged from the fuel cell stack may be measured and the temperature of the fuel cell stack may be estimated based on the measured coolant outlet temperature. However, as shown in the figure, since the coolant outlet temperature increases later after current of the fuel cell is generated and the increased temperature range is minimal, it is difficult to accurately estimate the temperature of the fuel cell stack.

In contrast, the figures show that the temperature of the separator disposed between the unit cells included in the fuel cell stack and the coolant rapidly increases as the current of the fuel cell increases. In addition, the increased temperature range is relatively large compared to the coolant outlet temperature. In other words, it may be possible to more accurately estimate the temperature of the fuel cell stack using the temperature of the separator. The figures further show that the estimated temperature of the separator according to the exemplary embodiment of the present invention is substantially equal to the actual temperature of the separator.

In the estimating of the temperature of the separator according to the exemplary embodiment of the present invention, on the assumption that the initial temperature of the separator is equal to that of the coolant, the temperature of the separator may be estimated by estimating temperature change of the separator according to heating caused by heat generated in the fuel cell stack and cooling caused by heat exchange with the coolant flowing between the separators.

Specifically, when input heat and output heat of the separator are calculated, the following heat exchange equation may be established.

$$C_{Bipolar}\frac{dT_b}{dt} = Q_{gen} - G_{Bipolar}(T_b - T_c)$$

wherein, $C_{Bipolar}$ denotes the thermal capacity of the separator, $T_b$ denotes the temperature of the separator, $Q_{gen}$ denotes the amount of heat generated in the fuel cell stack, $G_{Bipolar}$ denotes a heat transfer rate (heat transfer coefficient*area), and $T_c$ denotes the temperature of the coolant.

In other words, it may be assumed that the amount $Q_{gen}$ of heat generated in the fuel cell stack is transferred to the separator. The amount $Q_{gen}$ of heat generated in the fuel cell stack may be calculated by a product of the loss voltage of the fuel cell stack (an open circuit voltage (OCV)—the output voltage of the fuel cell stack) and the output current of the fuel cell stack.

In addition, the temperature $T_c$ of the coolant may be an average value of the coolant inlet temperature $T_i$ and the coolant outlet temperature $T_o$. When input heat and output heat of a portion excluding the separator in the fuel cell stack are calculated, the following heat exchange equation may be established.

$$C_{stack} \frac{dT_o}{dt} = w_c c_c (T_i - T_o) + G_{Bipolar}(T_b - T_c)$$

wherein, $C_{stack}$ denotes the thermal capacity of the portion excluding the separator in the fuel cell stack, $w_c$ denotes the flow rate of the coolant, $c_c$ denotes the specific heat of the coolant, $T_o$ denotes the coolant outlet temperature (the outlet of the fuel cell stack), and $T_i$ denotes the coolant inlet temperature (the inlet of the fuel cell stack).

The temperature change of the separator may be estimated using the above heat exchange equations. It may be assumed that the initial temperature of the separator is equal to the temperature of the coolant when power generation of the fuel cell starts. Therefore, it may be possible to estimate the temperature of the separator, which may be used to more accurately estimate the temperature of the fuel cell stack, using the actual temperature of the fuel cell stack.

In the adjusting of the ratio of the coolant, the opening degree of the valve for adjusting the flow rate of the coolant passing through the heat exchange device of the electronic thermostat or the opening degree of the valve for adjusting the flow rate of the coolant bypassing the heat exchange device may be adjusted.

In the above system, the electronic thermostat may be configured to adjust the ratio by adjusting the opening degree of the valve for adjusting the flow rate of the coolant passing through the heat exchange device or the flow rate of the coolant bypassing the heat exchange device. By adjusting the ratio of the coolant passing through the heat exchange device to the coolant bypassing the heat exchange, it may be possible to adjust the temperature of the coolant flowing into the inlet of the fuel cell stack.

Specifically, in adjusting of the ratio of the coolant, when the temperature $T_{fc}$ of the separator is equal to or greater than the predetermined reference temperature $T_{max}$, the inlet temperature $T_{i,target}$ of the coolant flowing into the fuel cell stack may be adjusted to the variable target temperature reduced from the predetermined target temperature $T_{i,base}$ in proportion to the difference $\Delta T$ between the temperature of the separator and the predetermined reference temperature. The predetermined reference temperature $T_{max}$ may be predetermined between 50° C. and 80° C.

In addition, in the adjusting of the ratio of the coolant, when the temperature $T_{fc}$ of the separator is less than the predetermined reference temperature $T_{max}$, the coolant inlet temperature may be adjusted to the predetermined target temperature $T_{i,base}$. In other words, the coolant inlet temperature $T_{i,target}$ may be adjusted by the following equation.

$$T_{i,target} = T_{i,base} - R_c \times \Delta T$$

wherein, $\Delta T = T_{fc} - T_{max}$, $R_c = 1$ (when $T_{fc} \geq T_{max}$), $R_c = 0$ (when $T_{fc} < T_{max}$)

When the temperature of the separator increases to the predetermined reference temperature or greater, the electronic thermostat may be proactively operated, thereby increasing the ratio of the coolant passing through the heat exchange device and decreasing the inlet temperature of coolant flowing into the fuel cell stack. In other words, the opening degree of the valve for adjusting the flow rate of the coolant passing through the heat exchange device may increase. In contrast, when the temperature of the separator is less than the predetermined reference temperature, since it is not necessary to further decrease the inlet temperature of the coolant flowing into the fuel cell, the inlet temperature of the coolant flowing into the fuel cell may be adjusted to the predetermined reference temperature, thereby increasing the temperature of the separator.

Figure 4:
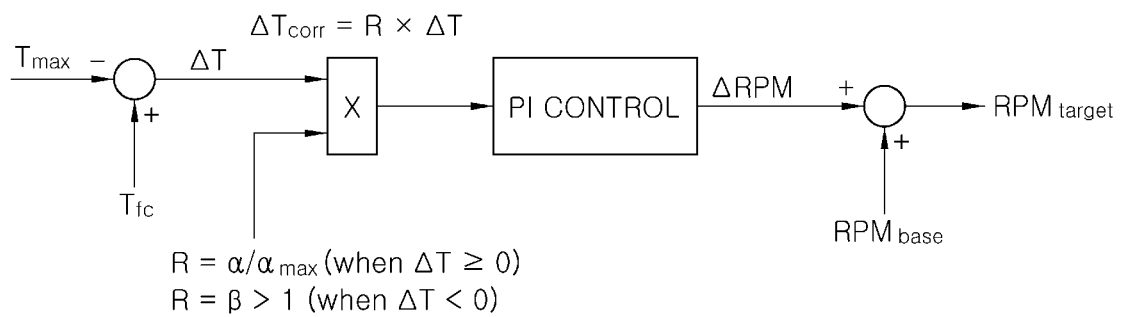
FIG. 4 is a diagram showing a configuration for controlling the rotation speed of a pump according to an exemplary embodiment of the present invention.

FIG. 4 is a diagram showing a configuration for controlling or adjusting the rotation speed of a pump according to an exemplary embodiment of the present invention. Referring to FIG. 4, in the adjusting of the rotation speed of the pump (S300) according to the exemplary embodiment of the present invention, it may be possible to adjust the rotation speed of the pump to a target rotation speed obtained by adding or subtracting a variable amount proportional to the difference between the temperature of the separator and the predetermined reference temperature to or from the predetermined rotation speed.

In other words, the target rotation speed $RPM_{target}$ may be set by adding or subtracting the variable amount $\Delta RPM$ proportional to the difference $\Delta T$ between the temperature of the separator greater than the predetermined reference temperature and the predetermined reference temperature to or from the predetermined rotation speed $RPM_{base}$, thereby adjusting the rotation speed of the pump. Therefore, the pump may be operated such that the flow rate of the coolant increases as the temperature of the separator increases, thereby efficiently cooling the fuel cell stack.

Specifically, in adjusting of the rotation speed of the pump (S300), when the temperature of the separator is equal to or greater than the predetermined reference temperature, the variable amount may be proportional to the opening degree of the valve for adjusting the flow rate of the coolant passing through the heat exchange device. In other words, when the temperature of the separator is equal to or greater than the predetermined reference temperature, in setting of the variable amount $\Delta RPM$, the difference $\Delta T$ between the temperature of the separator and the predetermined reference temperature may be corrected to be proportional to the opening degree of the valve and may be added to or subtracted from the predetermined rotation speed $RPM_{base}$, thereby setting the target rotation speed $RPM_{target}$.

In addition, in the adjusting of the rotation speed of the pump (S300), when the temperature of the separator is less than the predetermined reference temperature, the variable amount may be proportional to a predetermined ratio. In setting the variable amount $\Delta RPM$, the difference $\Delta T$ between the temperature of the separator and the predetermined reference temperature may be set to be proportional to the predetermined ratio.

The target rotation speed $RPM_{target}$ of the pump may be set according to proportional-integral (PI) control. The target rotation speed $RPM_{target}$ may be set by adding or subtracting the variable amount $\Delta RPM$ to or from the predetermined rotation speed $RPM_{base}$. The variable amount $\Delta RPM$ may be proportional to the difference $\Delta T$ between the temperature of the separator and the predetermined reference temperature and may use a corrected temperature difference $\Delta T_{corr}$.

When the temperature of the separator is equal to or greater than the predetermined temperature, the difference $\Delta T$ between the temperature of the separator and the predetermined reference temperature may be proportional to the opening degree α of the valve, that is, may be proportional to the ratio of the opening degree α of the valve to the maximum degree of opening $α_{max}$ of the valve. Accordingly, by adjusting the rotation speed of the pump to increase as the opening degree of the valve becomes closer to the maximum opening degree of the valve and thus the cooling margin using the electronic thermostat decreases, it may be possible to efficiently drive the pump and to improve fuel efficiency.

When the temperature of the separator is less than the predetermined temperature, the corrected temperature difference $ΔT_{corr}$ may be proportional to a predetermined ratio β. The predetermined ratio β may be appropriately set to a value greater than 1 in consideration of the speed at which the rotation speed of the pump decreases. Accordingly, when the temperature of the separator is less than the predetermined temperature, it may be possible to adjust the rate of decrease of the rotation speed of the pump.

In another exemplary embodiment, in the adjusting of the rotation speed of the pump (S300), the rotation speed of the pump may be adjusted to the predetermined rotation speed until the value for adjusting the flow rate of the coolant passing through the heat exchange device is completely opened. In other words, in setting of the variable amount ΔRPM, the corrected temperature difference $ΔT_{corr}$ may be set to 0 by multiplying the difference ΔT between the temperature of the separator and the predetermined reference temperature by 0 until the opening degree α of the valve becomes the maximum opening degree $α_{max}$ of the valve ($R_p$=0 (when α<$α_{max}$)).

The valve may be maximally controlled to adjust the temperature of the coolant and the rotation speed of the pump may be increased only when the control range of the valve is exceeded, thereby minimizing power consumption of the pump. In addition, in the adjusting of the rotation speed of the pump (S300), when the valve for adjusting the flow rate of the coolant passing through the heat exchange device is completely opened, the rotation speed of the pump may be adjusted to the target rotation speed obtained by adding the variable amount proportional to the difference between the temperature of the separator and the predetermined reference temperature to the predetermined rotation speed.

In other words, in setting of the variable amount ΔRPM, when the opening degree α of the valve becomes the maximum opening degree $α_{max}$ of the valve, the corrected temperature difference $ΔT_{corr}$ may be set to the difference ΔT between the temperature of the separator and the predetermined reference temperature ($R_p$=1 (when α=$α_{max}$)). Therefore, when the maximum value of the control range of the valve is reached, control may be performed to increase the rotation speed of the pump.

A cooling control method of a fuel cell according to another exemplary embodiment of the present invention may include estimating the temperature of the fuel cell stack (S100); adjusting the ratio of the coolant passing through the heat exchange device to the coolant bypassing the heat exchange device based on the estimated temperature of the fuel cell stack (S200); and adjusting the rotation speed of the pump for circulating the coolant for cooling the fuel cell stack based on the estimated temperature of the fuel cell stack (S300).

In the estimating of the temperature of the fuel cell stack (S100), the temperature of the fuel cell stack may be estimated using the outlet temperature of the coolant discharged from the fuel cell stack. Alternatively, the temperature of the fuel cell stack may be estimated using the coolant inlet and outlet temperatures of the fuel cell stack. As described above, the temperature of the separator may be estimated and assumed as the temperature of the fuel cell stack. By adjusting the rotation speed of the pump after adjusting the coolant inlet temperature according to the electronic thermostat without estimating the internal temperature of the fuel cell stack through separate calculation, it may be possible to reduce power consumption of the pump.

In a cooling control system and method of a fuel cell according to the present invention, it may be possible to proactively adjust the temperature of a fuel cell stack. In addition, it may be possible to rapidly and more accurately estimate the variable temperature of the fuel cell stack by estimating the temperature of a separator. Power consumption of a pump that circulates coolant may be minimized and fuel efficiency may be improved.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cooling control method of a fuel cell, comprising:
   estimating, by a controller, a temperature of a separator based on heat exchange between the separator formed between unit cells of a fuel cell stack and coolant flowing through a cooling line between the separators by estimating the temperature of the separator according to heat exchange between the fuel cell stack and the coolant using temperatures of the coolant respectively measured at an inlet and an outlet of the fuel cell stack and the amount of heat generated in the fuel cell stack;
   adjusting, by the controller, a ratio of coolant passing through a heat exchange device to coolant bypassing the heat exchange device based on the estimated temperature of the separator by adjusting an opening degree of a valve for adjusting a flow rate of coolant passing through the heat exchange device of an electronic thermostat or an opening degree of a valve for adjusting a flow rate of coolant bypassing the heat exchange device; and
   adjusting, by the controller, a rotation speed of a cooling pump for circulating coolant for cooling the fuel cell stack based on the estimated temperature of the separator,
   wherein the estimating of the temperature of the separator includes:
   assuming that an initial temperature of the separator is equal to the temperature of the coolant, estimating, by the controller, temperature change of the separator according to heating caused by the heat generated in the fuel cell stack and cooling caused by heat exchange with the coolant flowing between the separators, and
   wherein the adjusting of the rotation speed of the pump includes:
   adjusting, by the controller, the rotation speed of the pump to a target rotation speed obtained by adding or subtracting a variable amount proportional to a difference between the temperature of the separator and a predetermined reference temperature to or from a predetermined rotation speed, according to the opening degree of the valve.

2. The cooling control method according to claim 1, wherein the adjusting of the ratio of the coolant includes:
   adjusting, by the controller, an inlet temperature of the coolant flowing into the fuel cell stack to a variable target temperature reduced from a predetermined target temperature in proportion to a difference between the temperature of the separator and a predetermined reference temperature when the temperature of the separator is equal to or greater than the predetermined reference temperature.

3. The cooling control method according to claim 2, wherein the adjusting of the ratio of the coolant includes:
adjusting, by the controller, the inlet temperature of the coolant flowing into the fuel cell stack to the predetermined target temperature when the temperature of the separator is less than the predetermined reference temperature.

4. The cooling control method according to claim 1, wherein, in the adjusting of the rotation speed of the cooling pump, the variable amount is proportional to an opening degree of a valve for adjusting a flow rate of the coolant passing through the heat exchange device when the temperature of the separator is equal to or greater than the predetermined reference temperature.

5. The cooling control method according to claim 1, wherein, in the adjusting of the rotation speed of the cooling pump, the variable amount is proportional to a predetermined ratio when the temperature of the separator is less than the predetermined reference temperature.

6. The cooling control method according to claim 1, wherein the adjusting of the rotation speed of the cooling pump includes:
adjusting, by the controller, the rotation speed of the cooling pump to a predetermined rotation speed until a valve for adjusting a flow rate of the coolant passing through the heat exchange device is completely opened.

7. The cooling control method according to claim 6, wherein the adjusting of the rotation speed of the cooling pump includes:
adjusting, by the controller, the rotation speed of the cooling pump to a target rotation speed obtained by adding a variable amount proportional to a difference between the temperature of the separator and a predetermined reference temperature to the predetermined rotation speed when the valve for adjusting the flow rate of the coolant passing through the heat exchange device is completely opened.

8. A cooling control method of a fuel cell, comprising:
estimating, by the controller, a temperature of a fuel cell stack by estimating a temperature of a separator according to heat exchange between the fuel cell stack and a coolant using temperatures of the coolant respectively measured at an inlet and an outlet of the fuel cell stack and the amount of heat generated in the fuel cell stack;
adjusting, by the controller, a ratio of coolant passing through a heat exchange device to coolant bypassing the heat exchange device based on the estimated temperature of the fuel cell stack by adjusting an opening degree of a valve for adjusting a flow rate of coolant passing through the heat exchange device of an electronic thermostat or an opening degree of a valve for adjusting a flow rate of coolant bypassing the heat exchange device; and
adjusting, by the controller, a rotation speed of a cooling pump for circulating the coolant for cooling the fuel cell stack based on the estimated temperature of the fuel cell stack,
wherein the estimating of the temperature of the separator includes:
assuming that an initial temperature of the separator is equal to the temperature of the coolant, estimating, by the controller, temperature change of the separator according to heating caused by the heat generated in the fuel cell stack and cooling caused by heat exchange with the coolant flowing between the separators, and
wherein the adjusting of the rotation speed of the pump includes:
adjusting, by the controller, the rotation speed of the pump to a target rotation speed obtained by adding or subtracting a variable amount proportional to a difference between the temperature of the separator and a predetermined reference temperature to or from a predetermined rotation speed, according to the opening degree of the valve.

* * * * *